(12) United States Patent
Tsutsumi

(10) Patent No.: US 7,792,804 B2
(45) Date of Patent: Sep. 7, 2010

(54) DATA REGISTRATION METHOD AND APPARATUS

(75) Inventor: Tadaomi Tsutsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 11/831,358

(22) Filed: Jul. 31, 2007

(65) Prior Publication Data

US 2008/0033973 A1 Feb. 7, 2008

(30) Foreign Application Priority Data

Aug. 3, 2006 (JP) .............................. 2006-212243

(51) Int. Cl.
*G06F 17/30* (2006.01)
(52) U.S. Cl. ................... 707/693; 707/796; 707/694; 707/770; 707/E17.001; 707/E17.005; 709/203; 709/219
(58) Field of Classification Search ................ 707/100, 707/101, E17.001, E17.005, 999.101, 804, 707/796, 693, 694, 770; 709/203, 219
See application file for complete search history.

(56) References Cited

U.S. PATENT DOCUMENTS

| 4,992,887 | A | * | 2/1991 | Aragaki | 358/403 |
| 5,964,842 | A | * | 10/1999 | Packard | 709/247 |
| 5,974,182 | A | * | 10/1999 | Bryniarski et al. | 382/232 |
| 6,298,173 | B1 | * | 10/2001 | Lopresti | 382/305 |
| 6,976,026 | B1 | * | 12/2005 | Getzinger et al. | 707/101 |
| 7,200,603 | B1 | * | 4/2007 | Hitz et al. | 707/101 |
| 2003/0018802 | A1 | * | 1/2003 | Romanik et al. | 709/234 |
| 2006/0044601 | A1 | | 3/2006 | Misawa et al. | 358/1.15 |
| 2008/0037883 | A1 | | 2/2008 | Tsutsumi et al. | 382/232 |

* cited by examiner

*Primary Examiner*—Leslie Wong
*Assistant Examiner*—Shiow-Jy Fan
(74) *Attorney, Agent, or Firm*—Fitzpatrick, Cella, Harper & Scinto

(57) ABSTRACT

A data registration apparatus sets first data compression and second data compression, acquires the limit of the data amount of data to be registered in a database, and inputs data to be registered in the database. The data registration apparatus performs the first data compression and the second data compression for the inputted data. When the data amount of data compressed on the basis of the first data compression exceeds the acquired limit, the data registration apparatus registers data compressed on the basis of the second data compression in the database.

9 Claims, 7 Drawing Sheets

FIG. 3

```
<dataSet>
<server>
<name>DATABASE A </name>
<address>database.com</address>     } 302
</server>
<data>
<dataList name="Kaiin">
<item type="inputstring">name</item>                                    } 304
<item type="scanImage"colorsetting="color">card</item>  ~303
</dataList>
</data>
</dataSet>
```

FIG. 7

```
<dataSet>
<server>
<name>DATABASE C </name>
<address>databaseC.com</address>   ⎫ 802
</server>
<data>
<dataList name="Book">
<item type="scanString">bunsho</item>  ~ 803  ⎫ 804
</dataList>
</data>
</dataSet>
```

DATA REGISTRATION METHOD AND APPARATUS

This application claims the benefit of Japanese Patent Application No. 2006-212243, filed Aug. 3, 2006, which is hereby incorporated by reference herein in its entirety.

BACKGROUND OF THE INVENTION

1. Field of the Invention

The present invention relates to a data registration method and apparatus.

2. Description of the Related Art

A technique of registering data in a database has been generally known in services using a database on a network, like a CRM (Customer Relationship Management) system provided by the ASP (Application Service Provider) method.

When registering data in a network database, a technique of reducing the data amount is also generally known as a technique of reducing the data transfer traffic amount on a network in data transfer (US Patent Publication No. 2006/044601).

According to the conventional techniques, if the database limits the data format or the maximum size registrable in the database, the user must know the limitation when registering form data in the database via a network. As a result, the user must make and register settings under the limitation.

SUMMARY OF THE INVENTION

It is an object of the present invention to more easily register data in a database.

According to one aspect of the present invention, a data registration method comprises the steps of: setting first data compression and second data compression; acquiring a limit of a data amount of data to be registered in a database; inputting data to be registered in the database; performing the first data compression for the inputted data; performing the second data compression for the inputted data; and registering data compressed on the basis of the second data compression in the database, when a data amount of data compressed on the basis of the first data compression exceeds the acquired limit.

According to another aspect of the present invention, a data registration apparatus comprises: a setting unit adapted to set first data compression and second data compression; an acquisition unit adapted to acquire a limit of a data amount of data to be registered in a database; an input unit adapted to input data to be registered in the database; a compression unit adapted to perform the first data compression and the second data compression for the inputted data; and a registration unit adapted to register data compressed on the basis of the second data compression in the database, when a data amount of data compressed on the basis of the first data compression exceeds the acquired limit.

According to one another aspect of the present invention, a storage medium stores a computer program for data registration, the computer program comprising a program instructing the computer to perform a method comprising the steps of: setting first data compression and second data compression; acquiring a limit of a data amount of data to be registered in a database; inputting data to be registered in the database; performing the first data compression for the inputted data; performing the second data compression for the inputted data; and registering data compressed on the basis of the second data compression in the database, when a data amount of data compressed on the basis of the first data compression exceeds the acquired limit.

Further features of the present invention will become apparent from the following description of exemplary embodiments with reference to the attached drawings.

BRIEF DESCRIPTION OF THE DRAWINGS

FIG. 3 is a view showing a structure of data structure definition information;

FIG. 7 is a view showing a structure of data structure definition information used in the second embodiment of the present invention.

DESCRIPTION OF THE EMBODIMENTS

Preferred embodiments of the present invention will be described in detail below with reference to the accompanying drawings.

First Embodiment

Figure 1:
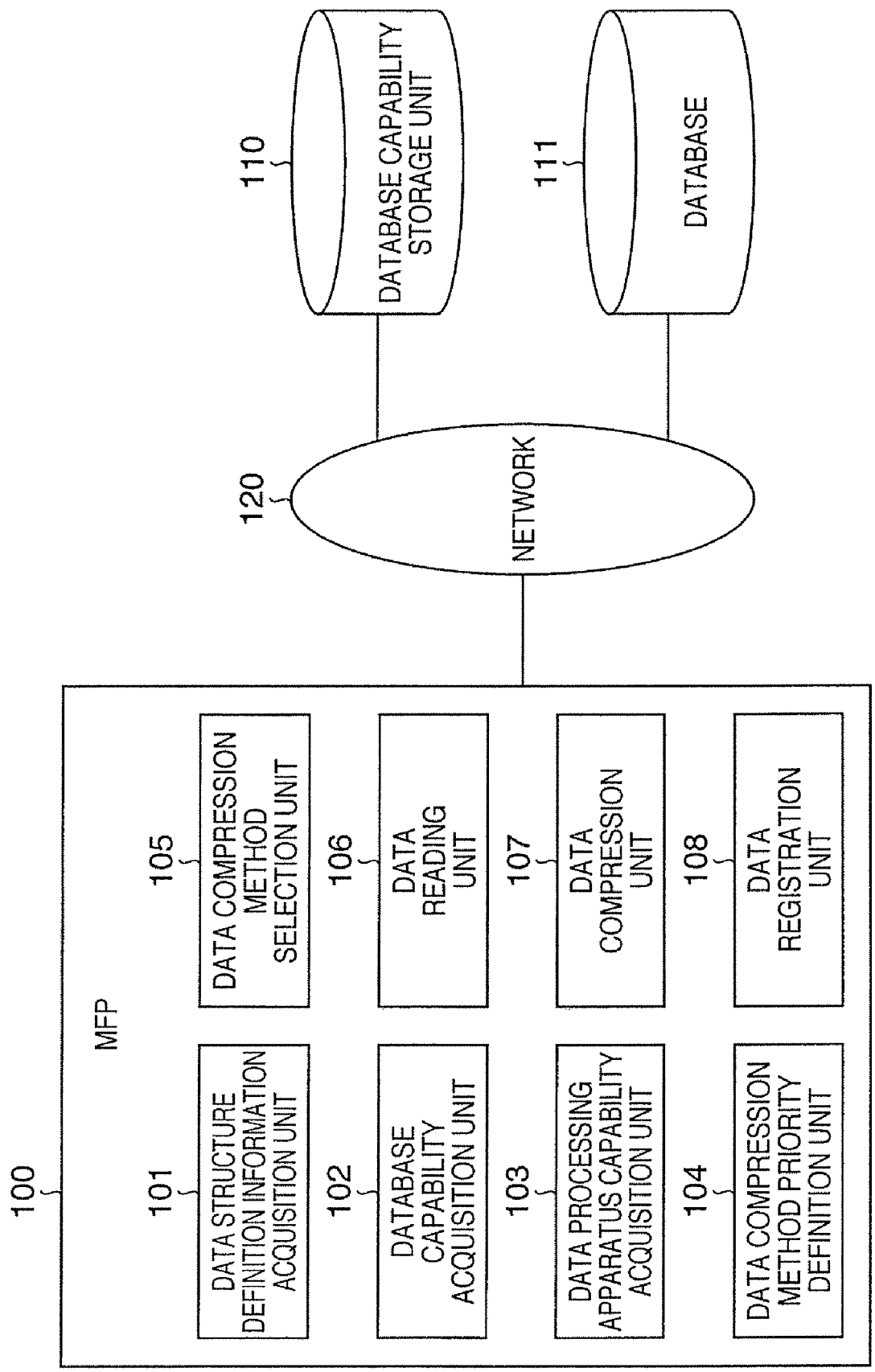
FIG. 1 is a block diagram showing the functional arrangement of a system according to the first embodiment of the present invention.

FIG. 1 is a block diagram showing the functional arrangement of a system according to the first embodiment. As shown in FIG. 1, the system according to the first embodiment comprises a multifunctional peripheral (MFP) 100, database 111, and database capability storage unit 110. The multifunctional peripheral 100, database 111, and database capability storage unit 110 are connected to a network 120 such as a LAN or the Internet, and can communicate data with each other via the network 120.

The multifunctional peripheral 100 will be described. The multifunctional peripheral 100 includes constituent elements 101 to 108 as functions. In FIG. 1, the data structure definition information acquisition unit 101 acquires data structure definition information (to be described later). The data structure definition information will be explained in detail with reference to FIG. 3.

The database capability acquisition unit 102 acquires device capability information representing the capability of the database 111 from the database capability storage unit 110. This device capability information will also be described later.

The data processing apparatus capability acquisition unit 103 acquires device capability information representing the capability of the multifunctional peripheral 100. This device capability information will also be described later.

The data compression method priority definition unit 104 defines priority levels for respective types of compression methods applicable as a compression method for data to be registered in the database 111.

The data compression method selection unit 105 selects one of compression methods used for data to be registered in the database 111.

The data reading unit 106 acquires (in this case, acquires by reading) data to be registered in the database 111.

The data compression unit 107 compresses data to be registered in the database 111 by using a compression method selected by the data compression method selection unit 105.

The data registration unit 108 transmits (registers) compressed data as a result of compression by the data compression unit 107 to the database 111 via the network 120.

The database 111 will be described. The database 111 is a device serving as a data registration destination. The database 111 may be the hard disk of an apparatus such as a server apparatus, or the hard disk of the multifunctional peripheral 100.

The database capability storage unit 110 will be explained. As described above, the database capability storage unit 110 holds device capability information representing the capability of the database 111. The database capability storage unit 110 may be the hard disk of an apparatus such as a server apparatus, or the hard disk of the multifunctional peripheral 100.

In FIG. 1, the multifunctional peripheral 100, database 111, and database capability storage unit 110 are separate devices, but two or more of them may be housed in a single apparatus.

Figure 2:
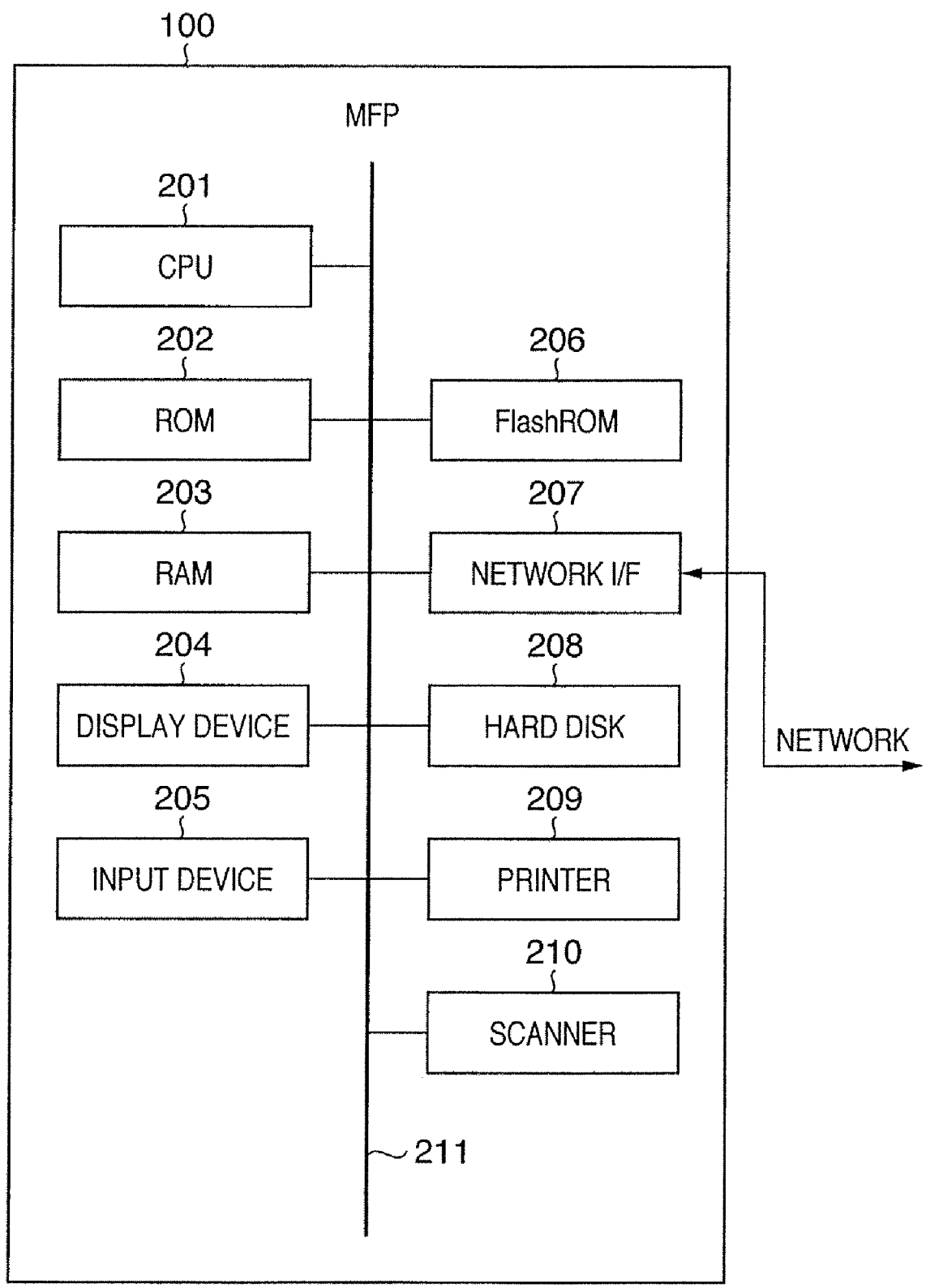
FIG. 2 is a block diagram showing the hardware configuration of a multifunctional peripheral 100.

FIG. 2 is a block diagram showing the hardware configuration of the multifunctional peripheral 100.

A CPU 201 controls the overall multifunctional peripheral 100 using programs and data stored in a ROM 202, RAM 203, and flash ROM 206. In addition, the CPU 201 executes processes to be described later as those performed by the multifunctional peripheral 100.

The ROM 202 stores programs and data which cause the CPU 201 to execute processes to be described later as those performed by the multifunctional peripheral 100. The ROM 202 also stores a startup program, setting data, and the like for the multifunctional peripheral 100. The CPU 201 implements the constituent elements 101 to 108 in FIG. 1 by executing programs stored in the ROM 202.

The RAM 203 has an area for temporarily storing programs and data read out from the ROM 202 and flash ROM 206, data externally received via a network I/F 207, and the like. The RAM 203 also has an area for temporarily storing programs and data loaded from a hard disk 208. Further, the RAM 203 has even a work area used when the CPU 201 executes various processes. That is, the RAM 203 can provide various areas, as needed.

A display device 204 is formed from, e.g., a touch panel type liquid crystal display. When the operator of the multifunctional peripheral 100 designates a desired position on the display screen of the display device 204, the CPU 201 executes a function corresponding to a button image displayed at the designated position.

An input device 205 is made up of physical buttons. The operator of the multifunctional peripheral 100 can operate the input device 205 to input various instructions to the CPU 201.

The flash ROM 206 stores various setting data files and the like.

The network I/F 207 connects the multifunctional peripheral 100 to the network 120. The multifunctional peripheral 100 can communicate data with the database 111 and database capability storage unit 110 via the network I/F 207.

The hard disk 208 saves data such as data externally received via the network I/F 207, data structure definition information (to be described later), and device capability information representing the capability of the multifunctional peripheral 100.

A printer 209 prints on a print medium such as paper on the basis of acquired data to be printed by the multifunctional peripheral 100.

A scanner 210 scans, as an image, information printed on a print medium such as paper.

A bus 211 connects the above-described units.

Figure 5:
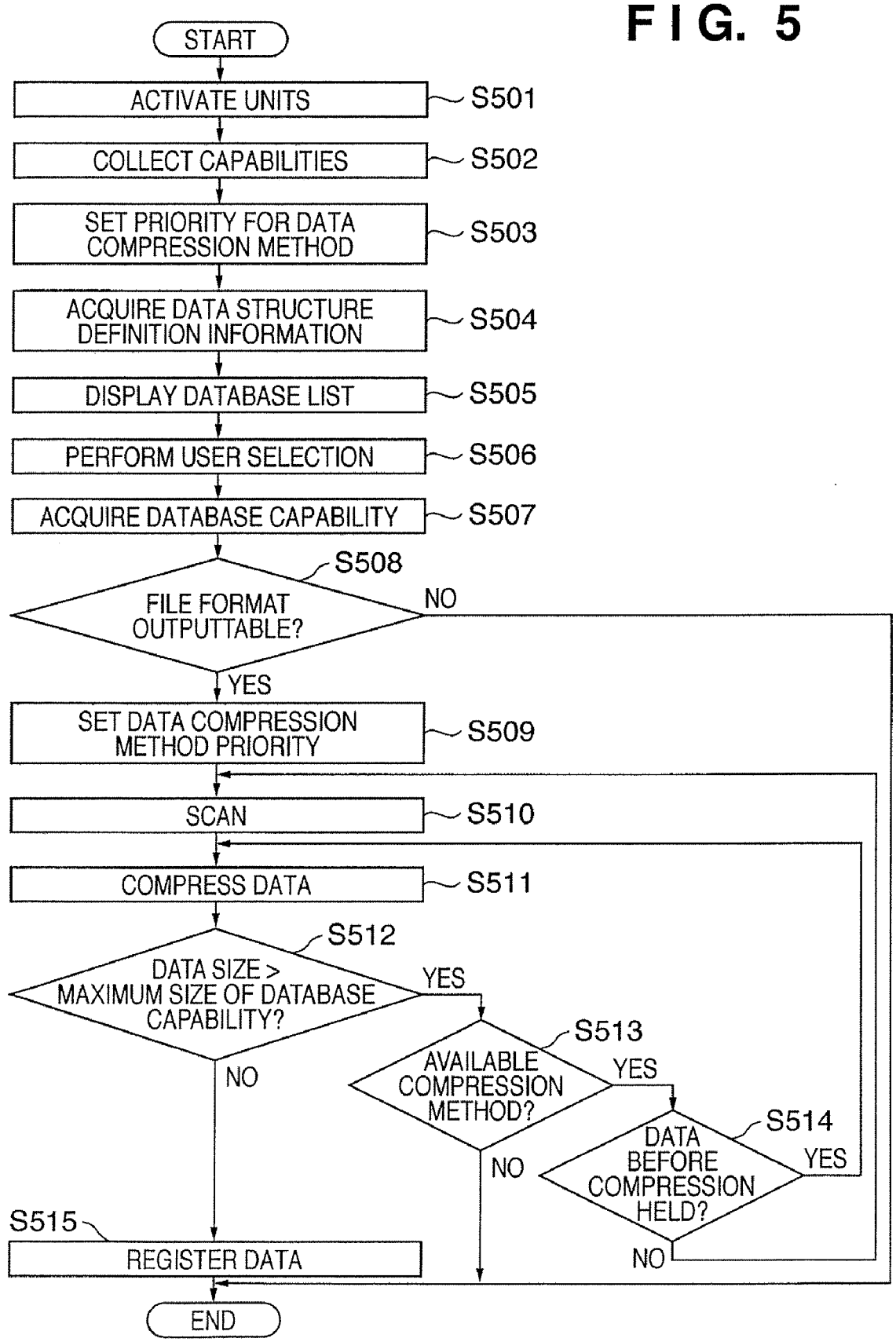
FIG. 5 is a flowchart of a process executed by the multifunctional peripheral 100 in order to register data in a database 111.

A process executed by the multifunctional peripheral 100 in the above-described system in order to register data in the database 111 will be described with reference to FIG. 5 showing the flowchart of this process. The ROM 202 stores programs and data which cause the CPU 201 to execute the process according to the flowchart of FIG. 5. The programs and data are loaded into the RAM 203 under the control of the CPU 201, as needed. The CPU 201 executes the process using the loaded programs and data, and the multifunctional peripheral 100 executes the following process.

When the operator of the multifunctional peripheral 100 turns on the multifunctional peripheral 100, the CPU 201 activates the respective units of the multifunctional peripheral 100 in step S501.

In step S502, the CPU 201 collects capabilities of the multifunctional peripheral 100 for a plurality of matters defined in advance as priority matters used when compressing data to be registered in the database 111. In the first embodiment, capabilities to be collected are outputtable file formats, possible color settings, and settable resolutions of the multifunctional peripheral 100.

Figure 4A:
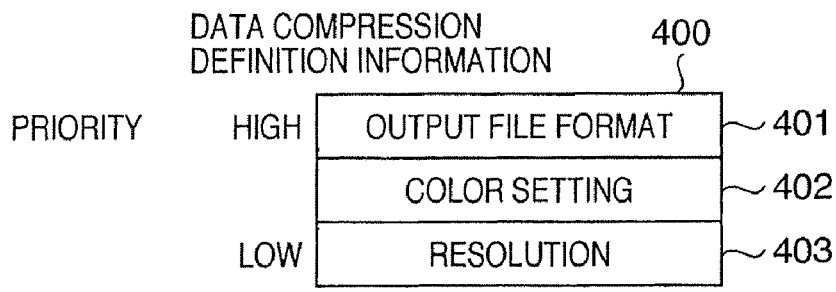
FIGS. 4A to 4D are views for explaining data compression definition information.
Figure 4B:
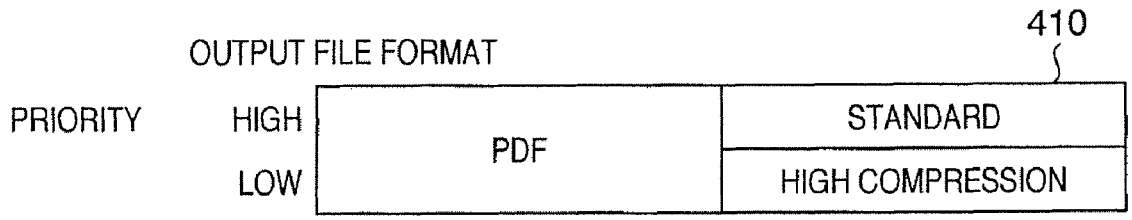

Capabilities collected for the output file format are registered in a field 401 of data compression definition information 400 shown in FIG. 4A. The data compression definition information 400 is registered in the RAM 203 or hard disk 208. FIG. 4B is a view showing the field 401 in detail. In FIG. 4B, this field is denoted as field 410 and comprises "PDF standard" and "PDF high compression", which are registered. In this case, the matter "output file format" includes two sub-matters "PDF standard" and "PDF high compression". The priority order of "PDF standard" is higher than that of "PDF high compression". The priority order may be set by the user or set in advance.

Figure 4C:
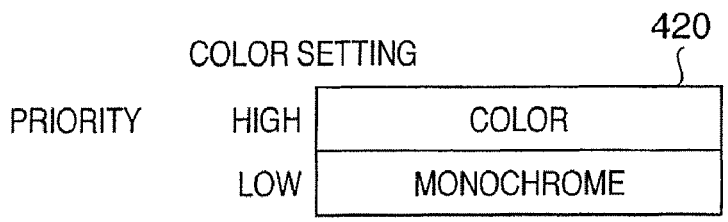

Capabilities collected for the color setting are registered in a field 402 of the data compression definition information 400. FIG. 4C is a view showing the field 402 in detail. In FIG. 4C, this field is denoted as field 420 and comprises "color" and "monochrome", which are registered. In this case, the matter "color setting" includes two sub-matters "color" and "monochrome". The priority order of "color" is higher than that of "monochrome". The priority order may be set by the user or set in advance.

Figure 4D:
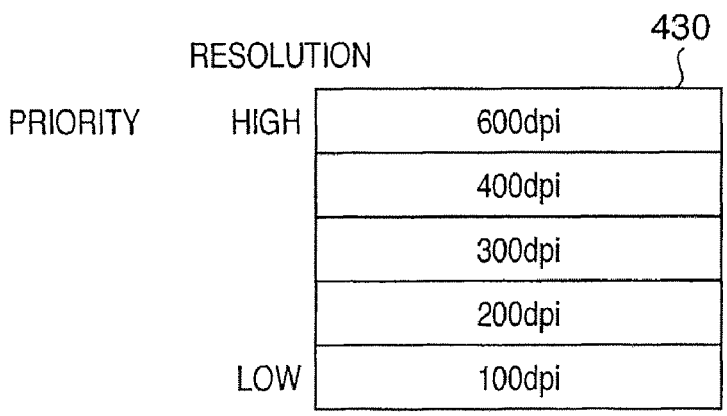

Capabilities collected for the resolution are registered in a field 403 of the data compression definition information 400. FIG. 4D is a view showing the field 403 in detail. In FIG. 4D, this field is denoted as field 430 and comprises "600 dpi", "400 dpi", "300 dpi", "200 dpi", and "100 dpi", which are registered. In this case, the matter "resolution" includes five sub-matters "600 dpi", "400 dpi", "300 dpi", "200 dpi", and "100 dpi". The priority order of each sub-matter is highest for "600 dpi", and descends in the order of "400 dpi", "300 dpi", "200 dpi", and "100 dpi". The priority order may be set by the user or set in advance.

In step S502, capabilities (sub-matters) for the matters "output file format", "color setting", and "resolution" are registered in the data compression definition information 400.

In step S503, the CPU 201 controls to display a setting GUI (Graphical User Interface) on the display screen of the display device 204. The setting GUI is used to set the reference values of the output file format, the color setting, and the resolution serving as a plurality of types of matters set in advance as priority matters used when compressing data to be registered in the database 111.

In setting the reference value of each matter, one of sub-matters of the matter is selected as a reference value. For example, "PDF standard" is selected as the reference value of the output file format, "color" is selected as that of the color setting, and "300 dpi" is selected as that of the resolution.

An operation to actually select the reference value of each matter via the GUI is as follows. For example, when setting the reference value of the output file format, the operator of the multifunctional peripheral 100 designates a portion displayed as "output file format". Then, the CPU 201 displays a menu of the two sub-matters shown in FIG. 4B, and the operator designates either sub-matter. By the series of operations, the designated sub-matter can be set as the reference value of the matter "output file format". This operation also applies to the remaining matters. However, the operation to set a reference value is not limited to this.

Sub-matters selected for the respective matters are stored in the RAM 203 or hard disk 208.

In step S504, the CPU 201 loads data structure definition information saved in the hard disk 208 into the RAM 203. FIG. 3 is a view showing a structure of the data structure definition information.

As shown in FIG. 3, the data structure definition information has a portion 302 describing information on a database available as a data registration destination, and a portion 304 describing information on data to be registered.

The portion 302 describes the name (in FIG. 3, "database A") of a database available as a data registration destination, and the address (in FIG. 3, "database.com") of the database on the network 120. When a plurality of databases are available as a data registration destination, the portion 302 describes a set of the name and address of each database by the number of available databases.

The portion 304 describes registration of data as a data list "Kaiin" having a "name" element and "card" element. The "name" element is defined by "item type="inputstring"", which means that a value input from the input device 205 is to be registered. The "card" element is defined by "item type="scanImage"", which means that data scanned by the scanner 210 is to be registered as an image.

A line 303 describes the use of a compression method corresponding to a sub-matter designated by "colorsetting="color"" when compressing data to be registered.

This data structure definition information is acquired by the multifunctional peripheral 100 by any method and saved in the hard disk 208 before performing the process according to the flowchart of FIG. 5.

In step S505, the CPU 201 refers to the portion 302 in the data structure definition information loaded into the PAM 203 in step S504. The CPU 201 extracts all database names described at the portion 302, and displays them on the display screen of the display device 204. When the portion 302 describes a plurality of database names, the CPU 201 extracts all database names, and displays a list of them on the display screen of the display device 204.

For example, five database names (databases A, B, C, D, and E) are extracted from the data structure definition information and listed.

The operator of the multifunctional peripheral 100 selects one of the listed database names. As the selection method, for example, the operator designates with his finger or the like an area where a desired database name is displayed on the display screen of the display device 204. In response to this, the CPU 201 specifies the database name displayed at the designated portion as a designated database name.

In step S506, the CPU 201 acquires the designated database name. In step S507, the CPU 201 accesses the designated database using an address which is paired with the designated database name and described at the portion 302. In the following description, the accessed database is the database 111 shown in FIG. 1.

The CPU 201 acquires, from the database 111, device capability information representing the capability of the database 111. Upon receiving the device capability information acquisition request from the multifunctional peripheral 100, the database 111 acquires its device capability information from the database capability storage unit 110 via the network 120, and transmits it to the multifunctional peripheral 100. The device capability information of the database 111 contains a maximum data size and file format registrable in the database 111.

In step S508, the CPU 201 checks whether the output file format (sub-matter shown in FIG. 4B) collected in step S502 corresponds to file format of data registered in the database 111. If the CPU 201 determines that the collected output file format does not correspond to file format of data registered in the database 111, the process ends.

If the CPU 201 determines that the collected output file format corresponds to file format of data registered in the database 111, the process advances to step S509. In step S509, priority levels are set for respective types of matters set in advance as priority matters used when compressing data to be registered in the database 111. For this purpose, the CPU 201 displays a priority setting GUI on the display screen of the display device 204. The priority setting GUI is used to set the priority order of a plurality of types of matters set in advance as priority matters used when compressing data to be registered in the database 111. As described above, these matters are the output file format, color setting, and resolution. For example, priority is the highest for the output file format, the second highest for the color setting, and the lowest for the resolution.

The operator of the multifunctional peripheral 100 designates the priority level of a desired matter by moving the desired matter to a desired position while designating the display position of the desired matter.

In step S510, the CPU 201 controls the scanner 210 to scan information printed on a print medium as an image in order to acquire data to be registered in the database 111. The CPU 201 saves the scanned image data in the hard disk 208. Data to be registered in the database 111 can be acquired by various methods, so the process in step S510 is not limited to this.

In step S511, the CPU 201 acquires a reference value set in step S503.

The CPU 201 compresses the image data acquired in step S510 by a compression method corresponding to the acquired reference value.

In step S512, the CPU 201 compares size X of the compressed data as a result of compression with "maximum data size registrable in the database 111" Y acquired in step S507. If $X \leq Y$, the process advances to step S515.

In step S515, the CPU 201 transmits the compressed data to the database 111 via the network I/F 207 in order to register the compressed data in the database 111.

If X>Y, the process advances to step S513. In step S513, the CPU 201 selects a sub-matter whose priority is the next highest priority with respect to a currently selected sub-matter in a currently selected matter. If no such sub-matter exists, the CPU 201 determines whether a matter of the second highest priority exists. If the CPU 201 determines that a matter of the second highest priority does not exist, the process ends. If the CPU 201 determines that a matter of the second highest priority exists, the CPU 201 selects a sub-matter serving as the reference value of the matter of the second highest priority. That is, if a compression method (output file format, color setting, or resolution) of the second highest priority exists, the CPU 201 selects it, and the process advances to step S514. The CPU 201 changes the matter in accordance with the priority set in step S509.

In step S514, the CPU 201 checks whether original data before compression in step S511 is held in the RAM 203 or hard disk 208. If the CPU 201 determines that no original data is held, the process returns to step S510. The CPU 201 controls the scanner 210 to obtain image data in order to acquire the original data again. In step S511, the CPU 201 compresses the image data acquired in step S510 by a compression method corresponding to the sub-matter selected in step S513.

If the CPU 201 determines that original data is held, the process returns to step S511. The CPU 201 compresses the image data acquired in step S510 by a compression method corresponding to the sub-matter selected in step S513.

When "color" is designated for the matter "color setting" as represented by the line 303 in FIG. 3, the sub-matter selected for the matter "color setting" is fixed to "color". When a sub-matter is defined in the data structure definition information, it is adopted.

Assume that priority is set in the order of the output file format, color setting, and resolution, the sub-matters of the respective matters have priority levels as shown in FIGS. 4B to 4D, and the reference values of the respective matters are "PDF standard", "color", and "300 dpi"

In this case, the CPU 201 compresses original data (image data) by a compression method corresponding to "PDF standard" in step S511. If the data size obtained as a result of compression exceeds the maximum data size registrable in the database 111, the CPU 201 selects a compression method corresponding to the sub-matter "PDF high compression" of the second highest priority in the matter "output file format". The CPU 201 compresses the original data (image data) again using the selected compression method.

If the data size obtained as a result of compression exceeds the maximum data size registrable in the database 111, a sub-matter of the third highest priority does not exist in the matter "output file format". In this case, a matter of the second highest priority is "color setting" Since "color" is designated for the matter "color setting" as represented by the line 303 in FIG. 3, a sub-matter selected for the matter "color setting" is fixed to "color".

If the sub-matter selected for the matter "color setting" is not fixed to "color", the CPU 201 converts data on the basis of the sub-matter "monochrome" of the second highest priority in the matter "color setting" (or scans data again in the monochrome mode). The CPU 201 compresses the data by "PDF high compression".

Then, the CPU 201 converts the data on the basis of the sub-matter "200 dpi" of the second highest priority in the matter "resolution" of the third highest priority (or scans data again at 200 dpi). The CPU 201 compresses the data by "PDF high compression".

If the data size obtained as a result of compression exceeds the maximum data size registrable in the database 111, the CPU 201 converts the data on the basis of the sub-matter "100 dpi" of the third highest priority in the matter "resolution" (or scans data again at 100 dpi). The CPU 201 compresses the data by "PDF high compression".

In this way, as long as the size of the compressed data exceeds the maximum data size registrable in the database 111, sub-matters are selected in the descending order of priority, the compression method is switched to one corresponding to the selected sub-matter, and compressed data is generated again. Finally, the obtained compressed data has a size registrable in the database 111, and a compression method considering the priority set in the multifunctional peripheral 100 is employed.

As described above, according to the first embodiment, data can be registered in a database at a database-registrable size or smaller. Even if a user who is to register data does not have technical knowledge about the database specifications, a data processing method, and the like, he or she can easily register data in the database.

Second Embodiment

The first embodiment has described a technique of compressing image data scanned by the scanner 210 and registering it in the database 111. The second embodiment will describe a technique of registering, in a database, a result of OCR-processing text information printed on a print medium. The arrangement of a system and those of apparatuses which form the system in the second embodiment are the same as those in the first embodiment.

Figure 6:
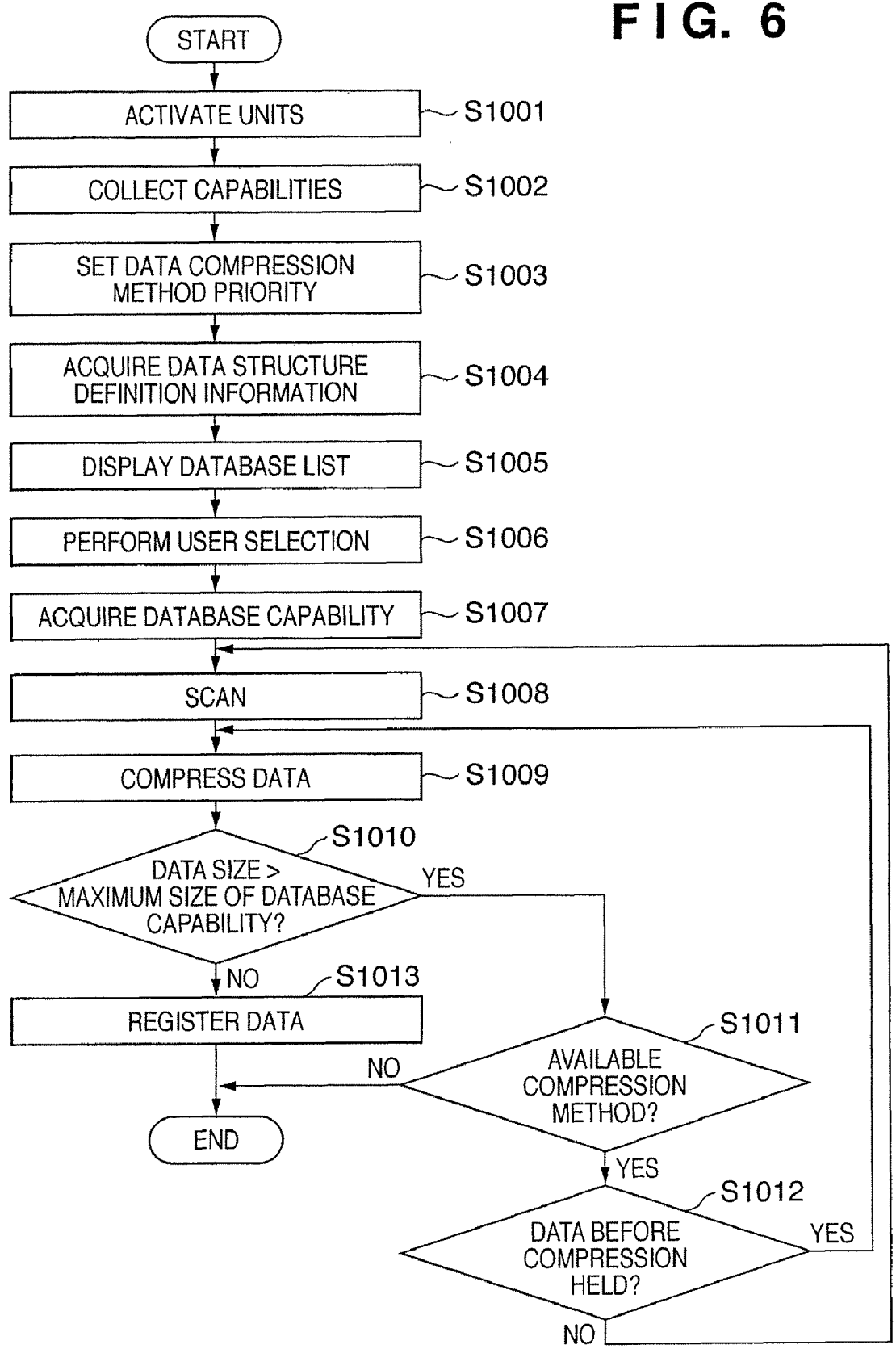
FIG. 6 is a flowchart of a process executed by a multifunctional peripheral 100 according to the second embodiment of the present invention in order to register text data as an OCR process result in a database 111.

A process executed by a multifunctional peripheral 100 according to the second embodiment in order to register text data as an OCR process result in a database 111 will be described with reference to FIG. 6 showing the flowchart of this process. A ROM 202 stores programs and data which cause a CPU 201 to execute the process according to the flowchart of FIG. 6. The programs and data are loaded into a RAM 203 under the control of the CPU 201, as needed. The CPU 201 executes the process using the loaded programs and data, and the multifunctional peripheral 100 executes the following process.

When the operator of the multifunctional peripheral 100 turns on the multifunctional peripheral 1001 the CPU 201 activates the respective units of the multifunctional peripheral 100 in step S1001.

In step S1002, the CPU 201 collects the capabilities of the multifunctional peripheral 100 for a plurality of matters defined in advance as priority matters used when compressing data to be registered in the database 111. In the second embodiment, the capabilities to be collected are compression methods available in the multifunctional peripheral 100 as a text data compression method.

Collected compression methods are registered in the RAM 203. In this case, compression methods (e.g., three, text compression methods A, B, and C) available in the multifunctional peripheral 100 are registered as a text data compression method. The priority levels of text compression methods A, B, and C are set to high, middle, and low, respectively. Concrete examples of the text compression methods are a method of compressing successive characters in a text, a method of converting text data into designated character codes, and a method of converting text data into, e.g., EUC codes, Unicodes, JIS codes, or shift JIS codes.

In step S1003, the CPU 201 causes the display screen of a display device 204 to display a GUI for setting priority levels for the three compression methods collected in step S1002.

The operator of the multifunctional peripheral 100 designates the priority level of a desired matter by moving the desired matter to a desired position while designating the display position of the desired matter. For example, priority is set in the order of text compression method A, text compression method B, and text compression method C.

In step S1004, the CPU 201 loads data structure definition information saved in a hard disk 208 into the RAM 203. FIG. 7 is a view showing a structure of the data structure definition information used in the second embodiment. As shown in FIG. 7, the data structure definition information has a portion 802 describing information on a database available as a data registration destination, and a portion 804 describing information on data to be registered.

The portion 802 describes the name (in FIG. 7, "database C") of a database available as a data registration destination, and the address (in FIG. 7, "databaseC.com") of the database on a network 120. When a plurality of databases are available as a data registration destination, the portion 802 describes a set of the name and address of each database by the number of available databases.

The portion 804 describes registration of data as a data list "Book" having a "bunsho" element.

This data structure definition information is acquired by the multifunctional peripheral 100 by any method and saved in the hard disk 208 before performing the process according to the flowchart of FIG. 6.

In step S1005, the CPU 201 refers to the portion 802 in the data structure definition information loaded into the RAM 203 in step S1004. The CPU 201 extracts all database names described at the portion 802, and displays them on the display screen of the display device 204. When the portion 802 describes a plurality of database names, the CPU 201 extracts all database names, and displays a list of them on the display screen of the display device 204. This display is achieved similarly to the first embodiment.

In step S1006, the CPU 201 acquires a database name designated by the operator from the list. In step S1007, the CPU 201 accesses the designated database using an address which is paired with the designated database name and described at the portion 802. In the following description, the accessed database is the database 111 shown in FIG. 1.

The CPU 201 acquires, from the database 111, device capability information representing the capability of the database 111. Upon receiving the device capability information acquisition request from the multifunctional peripheral 100, the database 111 acquires its device capability information from a database capability storage unit 110 via the network 120, and transmits it to the multifunctional peripheral 100. The device capability information of the database 111 contains a maximum data size and file format registrable in the database 111.

In step S1008, the CPU 201 controls a scanner 210 to scan information printed on a print medium in order to acquire data to be registered in the database 111. The CPU 201 OCR-processes the scanned text to obtain text data representing the result of recognizing characters. The CPU 201 saves the text data in the hard disk 208. Data to be registered in the database 111 can be acquired by various methods, so the process in step S1008 is not limited to this.

In step S1009, the CPU 201 selects a compression method of the highest priority by referring to the data compression definition information. The CPU 201 compresses the text data acquired in step S1008 using the selected compression method. Assume that priority is set in the order of compression method A, compression method B, and compression method C. In step S1009, first, the CPU 201 compresses text data using compression method A.

In step S1010, the CPU 201 compares size X of the compressed data as a result of compression with "maximum data size registrable in the database 111" Y acquired in step S1007. If $X \leq Y$, the process advances to step S1013.

In step S1013, the CPU 201 transmits the compressed data to the database 111 via a network I/F 207 in order to register the compressed data in the database 111.

If $X > Y$, the process advances to step S1011. In step S1011, the CPU 201 selects a compression method of the second highest priority. Then, the process advances to step S1012. If there is no compression method of the second highest priority, the process ends.

In step S1012, the CPU 201 checks whether original data before compression in step S1009 is held in the RAM 203 or hard disk 208. If the CPU 201 determines that no original data is held, the process returns to step S1008. The CPU 201 controls the scanner 210 to obtain text data in order to acquire the original data again.

If the CPU 201 determines that original data is held, the process returns to step S1009. The CPU 201 compresses the text data acquired in step S1008 using a compression method selected in step S1011.

Hence, finally obtained compressed data has a size registrable in the database 111, and a compression method considering priority set in the multifunctional peripheral 100 is employed.

Other Embodiments

The object of the present invention is also achieved as follows. More specifically, a recording medium (or storage medium) which records software program codes for implementing the functions of the above-described embodiments is supplied to a system or apparatus. The computer (or the CPU or MPU) of the system or apparatus reads out and executes the program codes stored in the recording medium. In this case, the program codes read out from the recording medium implement the functions of the above-described embodiments, and the recording medium which records the program codes constitutes the present invention.

Also, the present invention includes a case where the computer executes the readout program codes, and an OS (Operating System) or the like running on the computer performs some or all of actual processes on the basis of the instructions of the program codes, thereby implementing the functions of the above-described embodiments.

Furthermore, the present invention includes a case where the program codes read out from the recording medium are written in the memory of a function expansion card inserted into the computer or the memory of a function expansion unit connected to the computer, and the CPU of the function expansion card or function expansion unit performs some or all of actual processes on the basis of the instructions of the program codes, thereby implementing the functions of the above-described embodiments.

When the present invention is applied to the recording medium, program codes corresponding to the above-described flowcharts are stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A data registration method performed by a data registration apparatus comprising the steps of:
    connecting the data registration apparatus to a network;
    setting first data compression corresponding to a first item having a first priority among a plurality of items defined in advance as priority items used when compressing data and second data compression corresponding to a second item among the plurality of items and having a second priority lower than the first priority, wherein the plurality of priority items include at least one of an output file format, a color setting, and a resolution;
    acquiring a limit of a data amount of data to be registered in a database connected to the network;
    reading an original image using a scanner to generate image data;
    performing one of the first data compression and the second data compression for the generated image data;
    holding, when uncompressed image data not being compressed on the basis of the first data compression or the second data compression is generated by reading the original image using the scanner in the reading step according to a first reading operation, the generated uncompressed image data;
    registering first image data obtained by compressing the uncompressed image data on the basis of the second data compression into the database via the network when:
        (i) a data amount of image data obtained by compressing the generated image data on the basis of the first data compression exceeds the acquired limit, and
        (ii) the uncompressed image data remains in the data registration apparatus; and
    registering second image data obtained by compressing, on the basis of the second data compression, re-read image data generated by re-reading the original image using the scanner according to a second reading operation, into the database via the network when:
        (i) the data amount of image data obtained by compressing the generated image data on the basis of the first data compression exceeds the acquired limit, and
        (ii) the uncompressed image data does not remain in the data registration apparatus.

2. The method according to claim 1, wherein the first data compression is data compression in a color mode, and the second data compression is data compression in a monochrome mode.

3. The method according to claim 1, wherein in the setting step, priority levels are set for respective selection items, and one of the selection items corresponding to priority levels in the second data compression is different from the selection item in the first data compression set in the setting step.

4. A data registration apparatus comprising:
    a connection unit configured to connect the data registration apparatus to a network;
    a setting unit configured to set first data compression corresponding to a first item having a first priority among a plurality of items defined in advance as priority items used when compressing data and second data compression corresponding to a second item among the plurality of items and having a second priority lower than the first priority, wherein the plurality of priority items include at least one of an output file format, a color setting, and a resolution;
    an acquisition unit configured to acquire a limit of a data amount of data to be registered in a database connected to the network;
    an image reading unit configured to read an original image using a scanner to generate image data
    a compression unit configured to perform one of the first data compression and the second data compression for the generated image data;
    a holding unit configured to hold, when uncompressed image data not being compressed on the basis of the first data compression or the second data compression is generated by reading the original image using the scanner using said image reading unit according to a first reading operation, the generated uncompressed image data; and
    a registration unit configured to:
        register first image data obtained by compressing the uncompressed image data on the basis of the second data compression into the database via the network when:
            (i) a data amount of image data obtained by compressing the generated image data on the basis of the first data compression exceeds the acquired limit, and
            (ii) the uncompressed image data remains in the data registration apparatus, and
        register second image data obtained by compressing, on the basis of the second data compression, re-read image data generated by re-reading the original image using the scanner using said image reading unit according to a second reading operation, into the database via the network when:
            (i) the data amount of image data obtained by compressing the generated image data on the basis of the first data compression exceeds the acquired limit, and
            (ii) the uncompressed image data does not remain in the data registration apparatus.

5. The apparatus according to claim 4, wherein the first data compression is data compression in a color mode, and the second data compression is data compression in a monochrome mode.

6. The apparatus according to claim 4, wherein said setting unit sets priority levels for respective selection items, and one of the selection items corresponding to priority levels in the second data compression is different from the selection item in the first data compression set by said setting unit.

7. A storage medium which stores a computer program for data registration, the computer program instructing the computer to perform a method comprising the steps of:
    connecting a data registration apparatus to a network;
    setting first data compression corresponding to a first item having a first priority among a plurality of items defined in advance as priority items used when compressing data and second data compression corresponding to a second item among the items and having a second priority lower than the first priority, wherein the plurality of priority items include at least one of an output file format, a color setting, and a resolution;
    acquiring a limit of a data amount of data to be registered in a database connected to the network;
    reading an original image using a scanner to generate image data;
    performing one of the first data compression and the second data compression for the generated image data;
    holding, when uncompressed image data not being compressed on the basis of the first data compression or the second data compression is generated by reading the original image using the scanner in the reading step according to a first reading operation, the generated uncompressed image data;

registering first image data obtained by compressing the uncompressed image data on the basis of the second data compression into the database via the network when
(i) a data amount of image data obtained by compressing the generated image data on the basis of the first data compression exceeds the acquired limit, and
(ii) the uncompressed image data remains in the data registration apparatus; and registering second image data obtained by compressing, on the basis of the second data compression, re-read image data generated by re-reading the original image using the scanner according to a second reading operation, into the database via the network when:
(i) the data amount of image data obtained by compressing the generated image data on the basis of the first data compression exceeds the acquired limit, and
(ii) the uncompressed image data does not remain in the data registration apparatus.

8. The medium according to claim 7, wherein the first data compression is data compression in a color mode, and the second data compression is data compression in a monochrome mode.

9. The medium according to claim 7, wherein in the setting step, priority levels are set for respective selection items, and one of the selection items corresponding to priority levels in the second data compression is different from the selection item in the first data compression set in the setting step.

* * * * *